United States Patent
Martinage et al.

(10) Patent No.: US 12,312,273 B2
(45) Date of Patent: May 27, 2025

(54) CEMENT COMPOSITION FOR 3D PRINTING AND METHOD OF USE

(71) Applicant: VICAT, Paris la Defense (FR)

(72) Inventors: Olivier Martinage, Lyons (FR);
Damien Rogat, Villette d'Anthon (FR);
Laury Barnes-Davin, Voiron (FR)

(73) Assignee: VICAT, Paris la Defense (FR)

( * ) Notice: Subject to any disclaimer, the term of this patent is extended or adjusted under 35 U.S.C. 154(b) by 953 days.

(21) Appl. No.: 17/263,447

(22) PCT Filed: Jul. 25, 2019

(86) PCT No.: PCT/FR2019/051840
§ 371 (c)(1),
(2) Date: Jan. 26, 2021

(87) PCT Pub. No.: WO2020/021202
PCT Pub. Date: Jan. 30, 2020

(65) Prior Publication Data
US 2021/0284575 A1 Sep. 16, 2021

(30) Foreign Application Priority Data

Jul. 26, 2018 (FR) .................................. 18/56946

(51) Int. Cl.
*C04B 28/06* (2006.01)
*B28B 1/00* (2006.01)
(Continued)

(52) U.S. Cl.
CPC .............. *C04B 28/06* (2013.01); *B28B 1/001* (2013.01); *B33Y 10/00* (2014.12); *B33Y 40/10* (2020.01);
(Continued)

(58) Field of Classification Search
CPC ....... C04B 28/06; C04B 14/06; C04B 14/106; C04B 14/28; C04B 22/10; C04B 24/06;
(Continued)

(56) References Cited

U.S. PATENT DOCUMENTS

2017/0183556 A1\* 6/2017 Agapiou ................. C04B 28/34
2018/0029934 A1\* 2/2018 Monkman ........... C04B 40/0231

FOREIGN PATENT DOCUMENTS

CN 104310918 A 1/2015
DE 10 2010 062 061 A1 5/2012
(Continued)

OTHER PUBLICATIONS

Sooraj A. O. Nair et al. "Linking fresh paste microstructure, rheology and extrusion characteristics of cementitious binders for 3D printing" Journal of the American Ceramic Society., US. vol. 102, No. 7, Jan. 25, 2019, pp. 3951-3964. (Year: 2019).\*
(Continued)

*Primary Examiner* — Jennifer A Smith
*Assistant Examiner* — Jeffrey Eugene Barzach
(74) *Attorney, Agent, or Firm* — Oliff PLC

(57) ABSTRACT

A novel cement composition for 3D printing including has 90% to 99.5% by weight of one or more cements selected from a Portland cement, an aluminous cement, a sulphoaluminous cement and a prompt natural cement; and has 0.5% to 10% by weight of a silicoaluminous filler having a specific surface area of at least 5 $m^2/g$, as well as a method for implementing the composition.

10 Claims, 2 Drawing Sheets

One-component ink 3D printing device

(51) Int. Cl.
  *B33Y 10/00* (2015.01)
  *B33Y 40/10* (2020.01)
  *B33Y 70/00* (2020.01)
  *C04B 14/06* (2006.01)
  *C04B 14/10* (2006.01)
  *C04B 14/28* (2006.01)
  *C04B 22/10* (2006.01)
  *C04B 24/06* (2006.01)
  *C04B 28/04* (2006.01)
  *C04B 103/12* (2006.01)
  *C04B 103/22* (2006.01)
  *C04B 103/32* (2006.01)
  *C04B 111/00* (2006.01)

(52) U.S. Cl.
  CPC .............. *B33Y 70/00* (2014.12); *C04B 14/06* (2013.01); *C04B 14/106* (2013.01); *C04B 14/28* (2013.01); *C04B 22/10* (2013.01); *C04B 24/06* (2013.01); *C04B 28/04* (2013.01); *C04B 2103/12* (2013.01); *C04B 2103/22* (2013.01); *C04B 2103/32* (2013.01); *C04B 2111/00146* (2013.01); *C04B 2111/00181* (2013.01)

(58) Field of Classification Search
  CPC . C04B 28/04; C04B 2103/12; C04B 2103/22; C04B 2103/32; C04B 2111/00146; C04B 2111/00181; C04B 2111/00129; C04B 28/065; B28B 1/001; B33Y 10/00; B33Y 40/10; B33Y 70/00; Y02P 40/10
  See application file for complete search history.

(56) References Cited

FOREIGN PATENT DOCUMENTS

| | | | | |
|---|---|---|---|---|
| EP | 1 491 516 | A2 | 12/2004 | |
| FR | 2061507 | A2 | 6/1971 | |
| JP | 2001316145 | A * | 11/2001 | ........... C04B 18/101 |
| JP | 2008081357 | A * | 4/2008 | ........... C04B 18/146 |
| JP | 2008297170 | A | 12/2008 | |
| JP | 2010155758 | A * | 7/2010 | ............. C04B 28/02 |
| JP | 2018002510 | A * | 1/2018 | |
| KR | 100306056 | B1 * | 9/2001 | |
| WO | WO-2017106922 | A1 * | 6/2017 | |
| WO | 2018083010 | A1 | 5/2018 | |

OTHER PUBLICATIONS

Kumar, A., and Della M. Roy. "A study of silica-fume-modified cements of varied fineness." Journal of the American Ceramic Society, vol. 67, No. 1, Jan. 1984, pp. 61-64, https://doi.org/10.1111/j.1151-2916.1984.tb19149.x (Year: 1984).*
English machine translation of JP-2008081357-A (Year: 2008).*
English machine translation of JP-2010155758-A (Year: 2010).*
English machine translation of JP-2018002510-A (Year: 2018).*
English machine translation of KR-100306056-B1 (Year: 2001).*
English machine translation of JP-2001316145-A (Year: 2001).*
Nov. 6, 2019 Written Opinion of the International Searching Authority issued in International Patent Application No. PCT/FR2019/051840.
Nov. 6, 2019 International Search Report issued in International Patent Application No. PCT/FR2019/051840.
Sooraj A. O. Nair et al. "Linking fresh paste microstructure, rheology and extrusion characteristics of cementitious binders for 3D printing" Journal of the American Ceramic Society., US. vol. 102, No. 7, Jan. 25, 2019, pp. 3951-3964.
G S Slavcheva. "Drying and shrinkage of cement paste for 3D printable concrete" IOP Conference Series: Materials Science and Engineering, vol. 481, Mar. 11, 2019, p. 012043.
Wikipedia. "BET theory" Wikipedia, Oct. 17, 2019.
Wikipedia. "Fumee de silice" Wikipedia, Aug. 11, 2019.
Khalil, N. et al., "Use of calcium sulfoaluminate cements for setting control of 3D-printing mortars," Construction and Building Materials, vol. 157, pp. 382-391, 2017.
Shakor, P. et al., "Modified 3D printed powder to cement-based material and mechanical properties of cement scaffold used in 3D printing," Construction and Building Materials, vol. 138, pp. 398-409, 2017.
Soltan, D. et al., "A self-reinforced cementitious composite for building-scale 3D printing," Cement and Concrete Composites, vol. 90, pp. 1-13, 2018.
Translation of Feb. 7, 2023 Office Action issued in Brazilian Patent Application No. 112021001128-5.

* cited by examiner

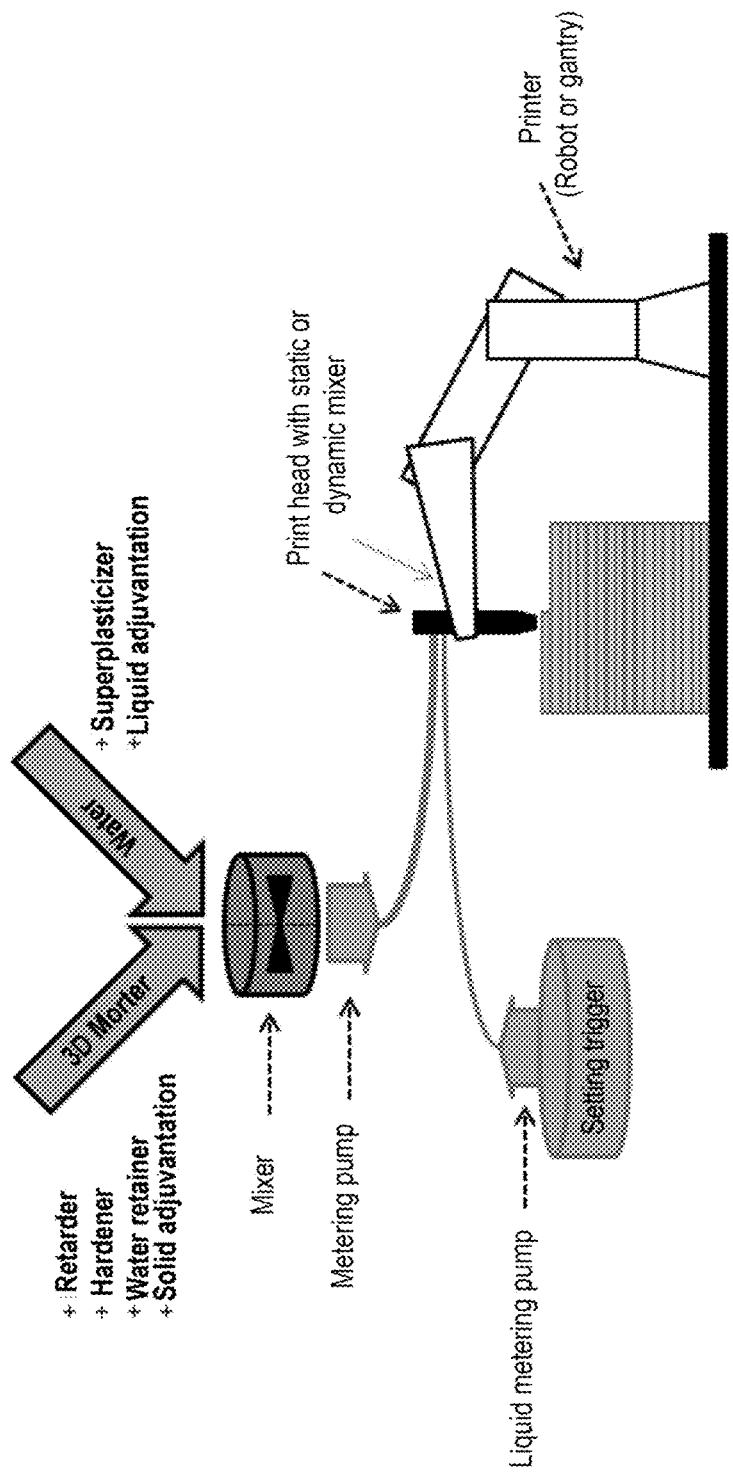
Figure 1 – One-component ink 3D printing device

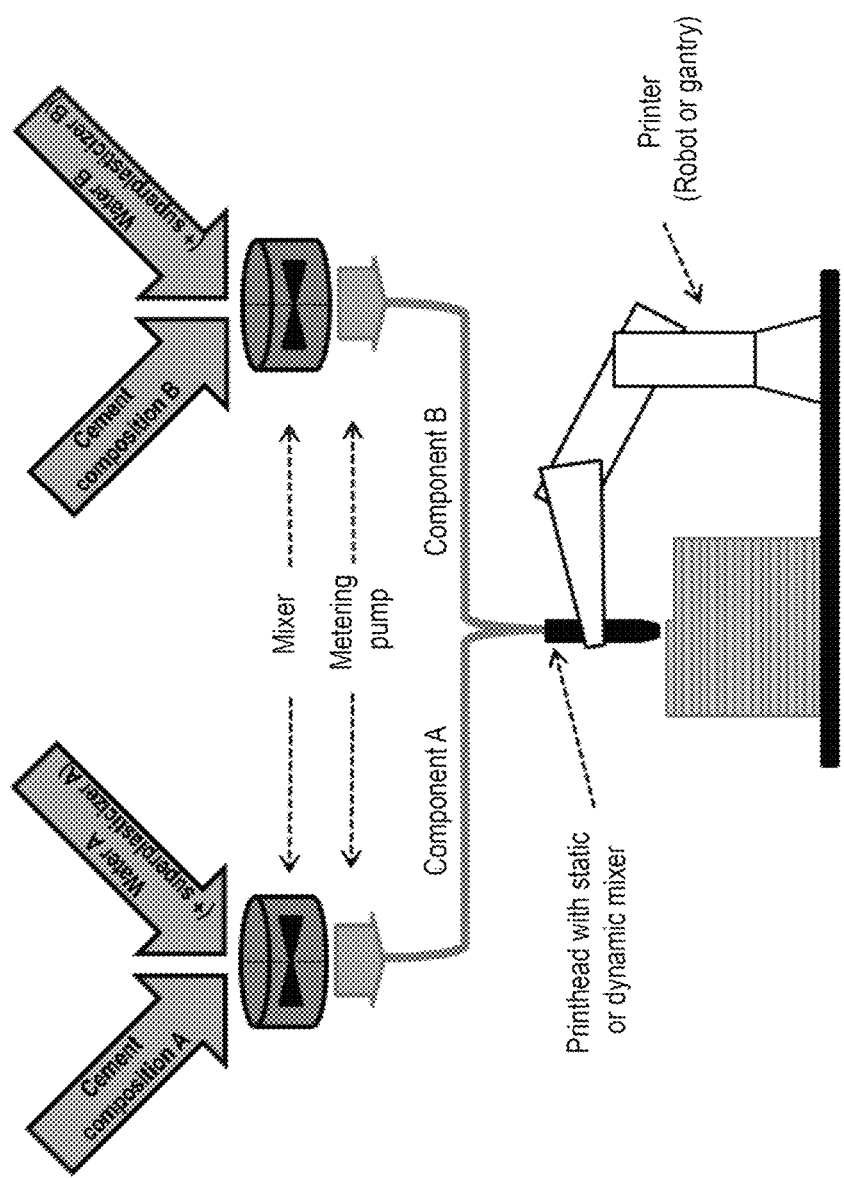
Figure 2 - Two-component ink 3D printing device

CEMENT COMPOSITION FOR 3D PRINTING AND METHOD OF USE

The present invention relates to a novel cement composition for 3D printing as well as a 3D printing method using said cement composition.

The 3D printing or three-dimensional printing designates the methods for manufacturing parts in volume by adding or agglomeration of material. In the industrial environment, it is also called additive manufacturing.

The additive manufacturing can be divided into several steps:
- design of the 3D object in the form of a drawing using a computer-aided design (or CAD) tool;
- treating of the 3D file obtained by a specific software («slicing» software) which organizes the slicing of the different layers necessary for the production of the part, and generation of a control file, the G-Code, which contains all the information to displace the print head precisely; then
- manufacturing of the object slice by slice via the execution of the G-code by the machine which deposits or solidifies the material layer by layer until obtaining the final part.

The principle remains close to that of a conventional 2D printer except that the stacking of layers allows creating the volume.

Originally, in the early 2000s, the 3D printing began with the use of heated resins and was primarily used for rapid prototyping. Then, innovative techniques using new materials such as plastic (PLA or ABS), wax, metal (aluminum, steel, titanium, platinum), plaster of Paris, ceramics and even glass, promptly emerged. Gains in time and manufacturing precision allow the production of parts in small series.

There are many applications for 3D printing. First confined to prototyping and visualization of ergonomics for architecture or design studies, then to equipment and prosthesis, it gradually gained industrial sectors ranging from the production of car parts, airplanes, buildings, consumer goods, etc.

Depending on the type of the used material, there are two main manufacturing techniques:
- depositing material or melting material in the case of plastic material: the plastic filament is heated at the level of the printing head which allows its extrusion and then hardens very promptly after being applied; or
- laser sintering mainly used for printing metal: a laser strikes a metal powder locally generating cohesion between the powder particles and the formation of a metal structure by sintering.

The 3D printing from cement materials in order to design structures more efficiently is also booming. The used printing method is similar to the method used for plastic materials, except that extrusion and hardening are not provided by heating at the print head.

In the case of printing cement material, whether it is cement paste, mortar or concrete, the material in the fluid state is pumped to a print head where it undergoes a sudden change in its rheology that allows it to be extruded into a bead of material that does not sag and supports its own weight.

The cement ink is prepared upstream of the printer in a mixer. It can be prepared by batch or via a continuous method. It is then pumped to the print head.

At the print head, the ink is mixed with an adjuvant that suddenly accelerates its setting. This mixing or mingling can be carried out using two technologies:
- the static mixer: this is a tube inside which numerous obstacles interfere with the flow of ink.

The turbulence thus generated makes it possible to homogenize the various constituents of the ink before extrusion; or
- the dynamic mixer consisting of a propeller (rotor) rotating in a tube (stator) and driven by a motor. This is the most efficient mingling technique.

At the end of this mixing, the ink is extruded through a nozzle into a bead of material of size defined by the material flow rate and the displacement speed of the print head, allowing the printing of the structure following the G-Code.

To be able to be used in 3D printing, a cement ink must therefore meet three main requirements:
- directly after its preparation, the composition must be sufficiently fluid to be pumpable but not to segregate (so-called «pumpability» criterion);
- during its passage through the print head, the composition must be able to undergo a sudden change in rheology in order to make it much more viscous and to allow the bead of mortar not to spread out after extrusion; and
- finally, after passing through the print head, the beads already extruded/printed must have sufficient strength to withstand the weight of the new extruded layer (so-called «buildability» criterion).

So far, in the majority of cases, cement inks containing essentially a Portland binder have been used. To do this, Portland cement is used as a suspension in water. However, besides the fact that upon contact with water, hydration begins to cause the cement to harden, which is not without causing difficulties in the 3D printing process, the increase in resistance of the ink thus prepared is slow, which limits the printing speed.

Alternatives to using Portland binder for preparing ink for 3D printing would therefore be useful.

Chinese patent application CN 104 310 918 describes a cement ink for 3D printing comprising one or two cements, in particular a mixture of sulphoaluminous cement and Portland cement, as well as optionally a filler selected from fly ash, slag powder, silica fume, activated gangue or blast furnace slag. Again, the increase in resistance of the ink thus prepared is slow or insufficient, which limits the printing speed or makes it impossible.

Finally, international patent application WO-A-2018/083010 thus describes a multi-component mortar system comprising a component A and a component B in which component A comprises aluminous cement and at least one inhibitor preventing setting, at least one inorganic filler and water, and component B comprises an initiator system for the inhibited aluminous cement, at least one inorganic filler and water. However, this solution is expensive, especially due to the use of the inhibitor.

At the date of the present invention, it therefore remains necessary to identify cement compositions exhibiting great reactivity and a very rapid or more controlled increase in strength as required, in particular to allow faster and of at least equivalent quality printing, and which does not require the use of hardening inhibitors.

Yet, it has now been found, quite surprisingly, that the addition of a silicoaluminous filler having a specific surface area of at least 5 $m^2/g$ with compositions comprising one or more cements made it possible to obtain cement inks having particular rheological properties, particularly a high threshold which, coupled with great reactivity and a very rapid or more controlled rise in resistance as required, thus allows faster printing and of at least equivalent quality.

BRIEF DESCRIPTION OF THE DRAWINGS

FIG. 1 is an example of a one-component ink 3D printing device.

FIG. 2 is an example of a two-component ink 3D printing device.

Thus, the present invention relates to a cement composition for 3D printing comprising:
- from 90% to 99.5% by weight of one or more cements selected from a Portland cement, an aluminous cement, a sulphoaluminous cement and a prompt natural cement; and
- from 0.5% to 10% by weight of a silicoaluminous filler having a specific surface area of at least 5 m²/g.

The cement composition according to the present invention exhibits great reactivity, a very rapid or more controlled increase in strength depending on the proportions of Portland cement, aluminous cement, sulphoaluminous cement and/or prompt natural cement in the composition. Furthermore, the presence of a silicoaluminous filler having a specific surface area of at least 5 m²/g makes it possible to significantly increase the printing speed (in particular by the generation of a threshold essential to the resistance of the printed structure) while maintaining or even improving the quality thereof.

In the context of the present invention:
- the term «cement composition for 3D printing» means any composition of cement, mortar or concrete which, after adding water, is likely to be used as ink in 3D printing;
- the term «Portland cement>» means any cement based on Portland clinker classified as CEM (I, II, III, IV or V) according to standard NF EN 197-1;
- the term «aluminous cement» means any cement, amorphous or not, obtained by firing a mixture of limestone and bauxite and containing at least 5% of monocalcium aluminate CA;
- the term «sulfoaluminous cement» means any cement prepared from a sulfoaluminous clinker containing 5% to 90% of 'yeelimite' phase $C_4A_3\$$, a source of sulfate, and, optionally, a lime addition;
- the term «prompt natural cement» means any hydraulic binder with rapid setting and hardening in accordance with standard NF P 15-314:1993 in force on the date of the present invention. Preferably, «prompt natural cement» designates a cement prepared from a clinker comprising:
    - from 0% to 20% of $C_3S$;
    - from 40% to 60% of $C_2S$;
    - from 7% to 12% of $C_4AF$;
    - from 2% to 10% of $C_3A$;
    - from 10% to 15% of $CaCO_3$ (calcite);
    - from 10% to 15% of $Ca_5 (SiO_4)_2CO_3$ (spurrite);
    - from 3% to 10% of sulfate phases: yeelimite $C_4A_3\$$, langbeinite $(K_2Mg_2 (SO_4)_3$, anhydrite $(CaSO_4)$; and
    - from 10% to 20% lime, periclase, quartz and/or one or more amorphous phases;
- the term «silicoaluminous filler having a specific surface area of at least 5 m²/g» means any mineral powder of natural origin, calcined natural, or resulting from industrial production consisting essentially of silica and/or alumina, and whose BET specific surface is greater than 5 m²/g. As examples of such fillers, mention may in particular be made of metakaolins or calcined clays in general or silica fumes with a BET specific surface greater than 5 m²/g.
- the term «limestone filler» means any finely ground limestone consisting essentially of calcium carbonate;
- the term «hardening accelerator» means any agent conventionally used as an adjuvant in concrete or mortar compositions with a view to accelerate the setting and/or hardening of the binder and to increase the mechanical performance of the concrete or the mortar. As example of a setting accelerator, mention may in particular be made of alkali metal salts such as sulphates (lithium, sodium, potassium or magnesium sulphate), nitrates (sodium, magnesium, potassium or lithium nitrates), thiocyanates (sodium, magnesium, potassium or lithium thiocyanate), carbonates (sodium, potassium, lithium, magnesium carbonate), hydroxides (sodium or potassium hydroxide), aluminates, silicates and chlorides (sodium, magnesium, potassium, or lithium chloride);
- the term «setting retarder» means any agent conventionally used as an adjuvant in concrete or mortar compositions with a view to delay the setting of concrete or fresh mortar. As an example of a setting retarder, mention may in particular be made of gluconates (sodium gluconate, potassium gluconate), carboxylic acids (citric acid, tartaric acid, etc.) and the associated bases (sodium citrate, sodium tartrate), boric acid, sodium borate and alkaline phosphates;
- the term «setting trigger» means any agent conventionally used to suddenly trigger the setting of a binder and drastically modify its rheology. As an example of a setting triggering agent, mention may in particular be made of the agents commonly used in sprayed concrete («Shotcrete») applications such as «alkaline» accelerators based on sodium or potassium silicate and «non-alkaline» accelerators based on aluminum sulphates or aluminum hydroxides; and
- the term «superplasticizer» means any synthetic polymer facilitating the placement of concrete, allowing a reduction in the required amount of the mixing water and/or increasing the strength of the hardened concrete. As examples of polymers which can be used as superplasticizers, mention may in particular be made of modified polycarboxylic ethers (PCE), polynaphthalene sulfonates (PNS), polymelamine sulfonates (PMS), calcium, sodium or ammonium lignosulfonates (LS) and polyacrylates.

In the context of the present invention, the following notations are adopted to designate the mineralogical components of cement:
C represents CaO;
A represents $Al_2O_3$;
F represents $Fe_2O_3$;
S represents $SiO_2$; and
\$ represents $SO_3$.

Thus, for example, the calcium aluminoferrite phase of a composition corresponding to the general formula $C_4AF$ actually corresponds to a $(CaO)_4(Al_2O_3) (Fe_2O_3)$ phase.

Finally, in the context of the present invention, the proportions expressed in % correspond to percentages by weight relative to the total weight of the considered entity.

A subject of the present invention is therefore a cement composition for 3D printing comprising a Portland cement, an aluminous cement, a sulphoaluminous cement and/or a prompt natural cement.

Preferably, the present invention relates to a cement composition for 3D printing as defined above in which the following characteristics are chosen alone or in combination:
- the composition contains a single cement;
- the cement composition contains from 95% to 99.5% of cement, preferably from 97.5% to 99.5% of cement;
- the cement composition contains from 10% to 95% by weight relative to the total weight of cement of a Portland cement, preferably from 20% to 95% by weight relative to the total weight of cement of a Portland cement; more preferably from 25% to 90% by weight relative to the total cement weight of a Portland cement; most preferably from 30% to 85% by weight relative to the total cement weight of a Portland cement;
- the cement composition contains from 5% to 90% by weight relative to the total weight of cement of an aluminous cement, of a sulphoaluminous cement and/or of a prompt natural cement; preferably from 5% to 80% by weight relative to the total weight of cement of an aluminous cement, of a sulphoaluminous cement and/or of a prompt natural cement; more preferably from 10% to 75% by weight relative to the total weight of cement of an aluminous cement, of a sulphoaluminous cement and/or of a prompt natural cement; most preferably from 15% to 70% by weight relative to the total weight of cement of an aluminous cement, of a sulphoaluminous cement and/or of a prompt natural cement;
- the cement composition contains a Portland cement and a sulphoaluminous cement;
- the cement composition contains 0.5% to 5% silicoaluminous filler having a specific surface area of at least 5 $m^2/g$; preferably from 0.5% to 2.5% silicoaluminous filler having a specific surface area area of at least 5 $m^2/g$;
- the silicoaluminous filler having a specific surface area of at least 5 $m^2/g$ is selected from natural pozzolans, calcined clays or silica fume; preferably the silicoaluminous filler having a specific surface area area of at least 5 $m^2/g$ is selected as being metakaolin or silica fume;
- the cement composition also contains a limestone filler;
- the cement composition also contains a setting retarder;
- the cement composition is in the form of a cement;
- the cement composition also contains sand and is in the form of a mortar; and or
- the cement composition also contains sand and aggregates and is in the form of concrete.

The cement composition according to the present invention can therefore be used in 3D printing. Thus, the present invention also relates to a 3D printing method comprising the following steps:
- bringing the cement composition as defined above into contact with water optionally added with superplasticizer and mixing of the whole;
- pumping of the cement ink thus obtained to the print head and possible addition of a setting trigger; and
- printing.

An example of a device allowing the implementation of the above method is described in FIG. 1.

When it contains a mixture of cements, the 3D printing cement composition according to the present invention can be in the form of a single composition (or one-component) containing both Portland cement and aluminous, sulphoaluminous and/or prompt natural cement, but also in the form of two compositions (or two-components) containing Portland cement on the one hand and aluminous, sulphoaluminous and/or prompt natural cement on the other hand, the two compositions then being combined/brought into contact at the print head. Thus, the present invention also relates to a kit useful for the preparation of a cement ink for 3D printing as defined above, said kit comprising:
- on the one hand, a Portland cement or a composition comprising Portland cement and any additions (additives, aggregates, etc.) described above;
- and on the other hand an aluminous, sulphoaluminous and/or prompt natural cement or a composition comprising the aluminous, sulphoaluminous and/or prompt natural cement and any additives (additives, aggregates, etc.) described above;

the silicoaluminous filler having a specific surface area of at least 5 $m^2/g$ which may be present in the element of the kit containing the Portland cement and/or in the element of the kit containing the aluminous, sulphoaluminous and/or prompt natural cement.

Preferably, the kit according to the present invention also has the following characteristics, chosen alone or in combination:
- the kit contains 25% to 90% by weight relative to the total weight of cement in the kit of a Portland cement, more preferably 30% to 85% by weight relative to the total weight of cement in the kit of a Portland cement;
- the kit contains from 10% to 75% by weight relative to the total weight of cement in the kit of an aluminous cement, of a sulphoaluminous cement and/or of a prompt natural cement, more preferably from 15% to 70% by weight relative to the total weight of cement in the kit of an aluminous cement, a sulphoaluminous cement and/or a prompt natural cement;
- the kit contains a Portland cement on the one hand and a sulphoaluminous cement on the other hand;
- the composition containing Portland cement contains the silicoaluminous filler having a specific surface area of at least 5 $m^2/g$. Preferably, the filler is selected from natural pozzolans, calcined clays or silica fume;
- the composition containing Portland cement also contains a limestone filler;
- the composition containing Portland cement also contains a setting retarder;
- the composition containing Portland cement also contains a superplasticizer;
- the composition containing Portland cement also contains sand and is in the form of mortar;
- the composition containing Portland cement also contains sand and aggregates and is in the form of concrete;
- the composition containing the aluminous, sulphoaluminous and/or prompt natural cement contains the silicoaluminous filler having a specific surface area of at least 5 $m^2/g$. Preferably, the filler is selected from natural pozzolans, calcined clays or silica fume. More preferably, the silicoaluminous filler having a specific surface area of at least 5 $m^2/g$ is selected as being metakaolin or silica fume;
- the composition containing the aluminous, sulphoaluminous and/or prompt natural cement also contains a limestone filler;

the composition containing the aluminous, sulphoaluminous and/or prompt natural cement also contains a setting retarder;

the composition containing the aluminous, sulphoaluminous and/or prompt natural cement also contains a superplasticizer;

the composition containing the aluminous, sulphoaluminous and/or prompt natural cement also contains sand and is in the form of a mortar; and or the composition containing the aluminous, sulphoaluminous and/or prompt natural cement also contains sand and aggregates and is in the form of concrete.

When bringing the two compositions into contact at the print head, it may be helpful to add a setting trigger. Thus, the kit according to the present invention can also contain (in addition to the two cements or to the two compositions containing the cements) a setting trigger.

The use of the kit described above makes it possible in particular to limit the quantity of adjuvants such as setting retarders or superplasticizers, or even not to use such adjuvants. Furthermore, in the case of adjuvantation, the use of the kit described above makes it possible to practice a cross adjuvantation, that is to say an adjuvant making it possible to accelerate the reactivity of the Portland cement is added to the composition containing the aluminous, sulphoaluminous and/or prompt natural cement and vice versa. So this adjuvant has no impact on the ink before the print head but reveals its effect when mixing the two compositions.

The «two-component» cement composition described above can therefore be used in 3D printing.

Thus, the present invention also relates to a 3D printing method comprising the following steps:
contacting the composition containing the Portland cement as defined above with water optionally added with superplasticizer and mixing the whole and, separately, contacting the composition containing the aluminous, sulphoaluminous and/or prompt natural cement as defined above with water optionally added with superplasticizer and mixing the whole;
pumping each of the compositions thus obtained to the print head, bringing them into contact, optionally in the presence of a setting trigger; and
printing.

An example of a device allowing the implementation of the above method is described in FIG. 2.

Finally, the present invention also relates to the use of a cement composition as described above for the preparation of an ink which can be used in 3D printing.

The present invention can be illustrated without limitation by the following examples.

EXAMPLE 1—CEMENT INK CONTAINING A SINGLE CEMENT 1.1—Composition

An ink for 3D printing (E-1) whose characteristics are reported in Table 1 below was prepared from a one-component cement ink.

TABLE 1

| | Ink E-1 for 3D printing | | | |
|---|---|---|---|---|
| Constituent | | Type | Weight/Volume | mass % |
| Premix | Portland Cement | CEM I 52.5 R | 562 g | 28.1 |
| | limestone filler | Omya Btocarb HP | 663 g | 33.2 |
| | Metakaolin | Argical 1000 | 10 g | 0.5 |
| | Silica sand | Sibelco HN31 | 765 g | 38.3 |
| Liquid adjuvantation | Superplasticizer | Chryso Optima 145 | 9 ml | 1.6 (% binder) |
| | Setting trigger | Chryso Jet 1000 | Adjustable volume | |
| Water | Premix Water | | 2000 g 270 g | W/C = 0.48 |

1.2—Preparation and Monitoring of Rheology

The ink E-1 was prepared in the laboratory in a mixer according to the following procedure:
dry mixing for 45 s of all the dry constituents to homogenize the mixture;
addition of water and superplasticizer in 15 s ($=T_0$);
mixing the whole for 3 minutes at low speed.

The rheology of the obtained composition (without adding a setting accelerator) was monitored at $T_0+3$ min, $T_0+20$ min and $T_0+30$ min and $T_0+60$ min by spreading on an ASTM cone (without shaking table). The results are reported in Table 2 below.

TABLE 2

| Ink E-1 rheology monitoring | |
|---|---|
| Time | Spreading (mm) |
| $T^0$ + 3 minutes | 175 |
| $T^0$ + 20 minutes | 180 |
| $T^0$ + 30 minutes | 180 |
| $T^0$ + 60 minutes | 180 |

There is no significant change in the rheology of the ink during the first 60 minutes and before setting triggering. The obtained rheology enables the pumping and use of the ink E-1 in a 3D print head.

1.3—Strengths after Triggering

The properties of the ink in terms of compressive strength with or without the addition of a setting accelerator (addition at $T_0+10$ min using a syringe) were evaluated according to the following protocol:
preparation of the cement ink according to the mixing protocol described in Example 2.2;
at $t_0+10$ min, adding 5 ml of setting trigger;
mixing at low speed for 15 seconds;
placing in 4×4×16 molds in a single pass (i.e. the mold is filled then undergoes 60 shocks in one minute).

The results obtained in terms of compressive strength (CS) are reported in Table 3 below.

TABLE 3

Ink E-1 compressive strength

| Volume of setting accelerator added (in ml) at $T_0$ + 10 min | | 5 |
|---|---|---|
| CS (MPa) | 24 h | 42.9 |
| | 7 days | 81.2 |
| | 28 days | 92.1 |

The observed strengths are compatible with the use of the ink E-1 in 3D printing.

EXAMPLE 2—ONE-COMPONENT CEMENT INK 2.1—Composition

An ink for 3D printing (E-2) whose characteristics are reported in Table 4 below was prepared from a one-component cement ink.

TABLE 4

Ink E-2 for 3D printing

| | Constituent | Type | Weight/Volume | mass % |
|---|---|---|---|---|
| Premix | Portland Cement | CEM I 52.5 N | 350 g | 17.5 |
| | Sulphoaluminous cement | Alpenat $R^2$ | 150 g | 7.5 |
| | Limestone filler | Omya Btocarb HP | 400 g | 20.0 |
| | Metakaolin | Argical 1000 | 100 g | 5.0 |
| | Silica sand | Sibelco HN31 | 1000 g | 50.0 |
| Solid adjuvantation | Retarder | Citric acid | 2.5 g | 0.5 (% binder) |
| | Setting trigger | Lithium carbonate | 2.0 g | 0.4 (% binder) |
| Liquid adjuvantation | Superplasticizer | Chryso Optima 145 | 7.5 ml | 1.5 (% binder) |
| | Setting trigger | Chryso Jet 1000 | Adjustable volume | |
| Water | Premix | | 2005.5 g | W/C = 0.55 |
| | Water | | 276 g | |

2.2—Preparation and Monitoring of Rheology

The ink E-2 was prepared in the laboratory in a mixer according to the following procedure:
- dry mixing for 45 s of all the dry constituents to homogenize the mixture;
- addition of water and superplasticizer in 15 s (=$T_0$);
- mixing the whole for 3 minutes at low speed.

The rheology of the obtained composition (without adding setting accelerator) was monitored at $T_0$+3 min, $T_0$+15 min and $T_0$+30 min by flow of 15 cm at the ASTM cone (without shaking table). The results are reported in Table 5 below.

TABLE 5

Ink E-2 rheology monitoring

| Time | Spreading (mm) |
|---|---|
| $T_0$ + 3 minutes | 152.5 |
| $T_0$ + 15 minutes | 165 |
| $T_0$ + 30 minutes | 150 |

There is no significant change in the rheology of the ink during the first 30 minutes and before setting triggering. The obtained rheology enables the pumping and use of the ink E-1 in a 3D print head.

2.3—Strengths after Triggering

The properties of the ink in terms of compressive strength with or without the addition of a setting accelerator (addition at $T_0$+10 min using a syringe) were evaluated according to the following protocol:
- preparation of the cement ink according to the mixing protocol described in Example 2.2;
- at t0+10 min, add 0 to 15 ml of setting trigger;
- mixing at low speed for 15 seconds;
- placing in 4×4×16 molds in a single pass (i.e. the mold is filled then undergoes 60 shocks in one minute).

The results obtained in terms of compressive strength (CS) are reported in Table 6 below.

TABLE 6

Ink E-2 compressive strength

| Volume of setting accelerator added (in ml) at $T_0$ + 10 min | | 0 | 5 | 10 | 15 |
|---|---|---|---|---|---|
| CS (MPa) | 24 h | 15.4 | 14.2 | 13.7 | 12.9 |
| | 7 days | 51.6 | 49.4 | 44.5 | 42.3 |
| | 28 days | 93.3 | 86.2 | 80.7 | 77.7 |

The observed strengths are compatible with the use of the ink E-2 in 3D printing, regardless of the expiration date and or the added amount of setting accelerator. The decrease in CS due to the addition of the setting trigger was expected. However, it remains moderate.

EXAMPLE 3—ONE-COMPONENT CEMENT INKS 3.1—Compositions

Two inks for 3D printing (E-3 and E-4) whose characteristics are reported in Tables 7 and 8 below were prepared from a one-component cement ink.

TABLE 7

Ink E-3 for 3D printing

| | Constituent | Type | Weight/Volume | mass % |
|---|---|---|---|---|
| Premix | Portland Cement | CEM I 52.5 N | 427.13 g | 21.3 |
| | Sulphoaluminous cement | Alpenat $R^2$ | 75.38 g | 3.8 |
| | Limestone filler | Omya Betocarb HP | 402 g | 20.0 |
| | Metakaolin | Argical 1000 | 100.5 g | 5.0 |
| | Silica sand | Sibelco HN31 | 1000.5 g | 49.9 |
| Solid adjuvantation | Retarder | Citric acid | 3.52 g | 0.7 (% binder) |
| | Hardener | Lithium carbonate | 2.01 g | 0.4 (% binder) |
| Liquid adjuvantation | Superplasticizer | Chryso Optima 145 | 9.5 ml | 1.9 (% binder) |
| | Setting trigger | Chryso Jet 1000 | Adjustable volume | |
| Water | Premix | | 2010.0 g | W/C = 0.54 |
| | Water | | 269 g | |

TABLE 8

Ink E-4 for 3D printing

| | Constituent | Type | Weight/Volume | mass % |
|---|---|---|---|---|
| Premix | Portland Cement | CEM I 52.5 N | 412.25 g | 21.3 |
| | Sulphoaluminous cement | Alpenat $R^2$ | 72.75 g | 3.8 |
| | Limestone filler | Omya Betocarb HP | 630.5 g | 32.5 |
| | Metakaolin | Argical 1000 | 97 g | 5.0 |
| | Silica sand | Sibelco HN31 | 727.5 g | 37.5 |
| Solid adjuvantation | Retarder | Citric acid | 4.85 g | 1.0 (% binder) |
| | Hardener | Lithium carbonate | 1.94 g | 0.4 (% binder) |
| Liquid adjuvantation | Superplasticizer | Chryso Optima 145 | 9.5 ml | 2.0 (% binder) |
| | Setting trigger | Chryso Jet 1000 | Adjustable volume | |
| Water | Premix | | 1940 g | W/C = 0.58 |
| | Water | | 285 g | |

3.2—Preparation and Monitoring of Rheology

The inks E-3 and E-4 were prepared in the laboratory in a mixer according to the following procedure:

dry mixing for 45 s of all the dry constituents to homogenize the mixture;

addition of water and superplasticizer in 15 s ($=T_0$);

mixing the whole for 3 minutes at low speed.

The rheology of the obtained composition (without adding setting accelerator) was monitored at different times between $T_0+3$ min and $T_0+135$ min by flow of 15 cm at the ASTM cone (without shaking table). The results are reported in Table 9 below.

TABLE 9

Inks E-3 and E-4 rheology monitoring

| | Spreading (mm) | |
|---|---|---|
| Time | E-3 | E-4 |
| $T_0$ + 3 minutes | 190 | 170 |
| $T_0$ + 15 minutes | 225 | 215 |
| $T_0$ + 30 minutes | 280 | 230 |
| $T_0$ + 55 minutes | 285 | 232 |
| $T_0$ + 75 minutes | 292 | 225 |
| $T_0$ + 95 minutes | 290 | 222 |
| $T_0$ + 115 minutes | 285 | 205 |
| $T_0$ + 135 minutes | 272 | 195 |

There is no significant change in the rheology of the inks during the first 30 minutes and before the setting triggering. An increase in spreading is observed initially and then a gradual decrease ((bell effect) characteristic of highly adjuvanted materials. However, after more than two hours, the spread is still greater than 200 mm, which allows for any risk of setting in the print head. The obtained rheology therefore allows the use of inks E-3 and E-4 in a 3D print head.

EXAMPLE 4—TWO-COMPONENT CEMENT INK

A two-component cement ink (E-5) whose characteristics are reported in Table 10 below was prepared.

TABLE 10

Ink E-5 for 3D printing

| | Constituent | Type | Component A | Component B |
|---|---|---|---|---|
| Premix | Portland Cement | CEM I 52.5 N | — | 50 g |
| | Sulphoaluminous cement | Alpenat $R^2$ | 33 g | — |
| | Limestone filler | Omya Betocarb HP | — | 17 g |
| Solid adjuvantation | Retarder | Citric acid | 0.1 g | 0.07 g |
| | Setting trigger | Lithium carbonate | | 0.17 g |
| | Water | | 17.5 g | 17.5 g |

In the example presented above, lithium carbonate has a very moderate effect on the increase in strength of Portland cement considered alone and it does not or very little disrupt its rheology. After mixing, the formed binder consists of Alpenat $R^2$ and Portland cement CEM I in proportions of 60/40, formula setting in a few seconds, and the lithium carbonate then accelerates the increase in strength of the mixture. This «cross-adjuvantation» allows the introduction of adjuvants having a powerful effect on one component (A) via the other component (B), their effect only being triggered when the two components meet.

Each component of the ink has been prepared separately. The dry materials were mixed for 45 seconds at low speed then water was added for 15 seconds. The cement paste is then mixed for one minute at low speed.

The two components were then introduced into syringes connected to a static mixer in which they are brought into contact.

At the output of this mixer, the mixture of the two components has set and the material has passed from the liquid state to that of thick paste in a few seconds without it being necessary to add liquid adjuvants such as a superplasticizer or a setting trigger.

EXAMPLE 5—COMPARATIVE TESTS

5.1—Tested Compositions

The inks for 3D printing (E-6 to E-9) whose characteristics are reported in Tables 11 to 14 below, were prepared from a one-component cement inks.

TABLE 11

Ink E-6 for 3D printing

| | Constituent | Type | Weight/Volume |
|---|---|---|---|
| Premix | Portland Cement | CEM I 52.5 N | 425 g |
| | Sulphoaluminous cement | Alpenat $R^2$ | 75 g |
| | Limestone filler | Omya Betocarb HP | 650 g |
| | Metakaolin | Argical 1000 | 100 g |
| | Silica sand | Sibelco HN31 | 750 g |
| Solid adjuvantation | Retarder | Citric acid | 5 g |
| | Hardener | Lithium carbonate | 2 g |
| Liquid adjuvantation | Superplasticizer | Chryso Optima 145 | 9.8 ml |
| | Setting trigger | Chryso Jet 1000 | 10 ml |
| Water | Premix | | 2000 g W/C = 0.59 |
| | Water | | 293.8 ml |

TABLE 12

Ink E-7 for 3D printing

| | Constituent | Type | Weight/Volume |
|---|---|---|---|
| Premix | Portland Cement | CEM I 52.5 N | 425 g |
| | Sulphoaluminous cement | Alpenat R$^2$ | 75 g |
| | Limestone filler | Omya Betocarb HP | 750 g |
| | Metakaolin | Argical 1000 | — |
| | Silica sand | Sibelco HN31 | 750 g |
| Solid adjuvantation | Retarder | Citric acid | 5 g |
| | Hardener | Lithium carbonate | 2 g |
| Liquid adjuvantation | Superplasticizer | Chryso Optima 145 | 9.8 ml |
| | Setting trigger | Chryso Jet 1000 | 10 ml |
| Water | Premix | 2000 g | W/C = 0.59 |
| | Water | 293.8 ml | |

TABLE 13

Ink E-8 for 3D printing

| | Constituent | Type | Poids/Volume |
|---|---|---|---|
| Premix | Portland Cement | CEM I 52.5 N | 561.3 g |
| | Sulphoaluminous cement | Alpenat R$^2$ | — |
| | Limestone filler | Omya Betocarb HP | 663.3 g |
| | Metakaolin | Argical 1000 | 10 g |
| | Silica sand | Sibelco HN31 | 765.4 g |
| Solid adjuvantation | Retarder | Citric acid | — |
| | Hardener | Lithium carbonate | — |
| Liquid adjuvantation | Superplasticizer | Chryso Optima 145 | 9 ml |
| | Setting trigger | Chryso Jet 1000 | 10 ml |
| Water | Premix | 2000 g | W/C = 0.48 |
| | Water | 270 ml | |

TABLE 14

Ink E-9 for 3D printing

| | Constituent | Type | Poids/Volume |
|---|---|---|---|
| Premix | Portland Cement | CEM I 52.5 N | 561.3 g |
| | Sulphoaluminous cement | Alpenat R$^2$ | — |
| | Limestone filler | Omya Betocarb HP | 673.3 g |
| | Metakaolin | Argical 1000 | — |
| | Silica sand | Sibelco HN31 | 765.4 g |
| Solid adjuvantation | Retarder | Citric acid | — |
| | Hardener | Lithium carbonate | — |
| Liquid adjuvantation | Superplasticizer | Chryso Optima 145 | 9 ml |
| | Setting trigger | Chryso Jet 1000 | 10 ml |
| Water | Premix | 2000 g | W/C = 0.48 |
| | Water | 270 ml | |

5.2—Preparation and Monitoring of Rheology

Inks E-6 to E-9 were prepared in the laboratory in a mixer according to the following procedure:
- dry mixing for 45 s of all the dry constituents to homogenize the mixture;
- addition of water and superplasticizer in 15 s (=$T_0$);
- mixing the whole for 3 minutes at low speed.

The indicated amount of setting trigger (Chryso Jet 1000 AF) is then added and the ink is mixed again for 30 seconds.

Layers of material are then stacked successively in order to validate the buildability criterion or the ability of the ink to support its own weight and that of successive layers.

For this experiment, a cylindrical die of 40 mm diameter and 30 mm high is used. Successive layers are added at a rate of 1 layer every 30 seconds.

This test makes it possible to study the behavior of the first deposited layer when the load applied to it increases.

It is observed that for inks E-7 and E-9 (which do not contain silicoaluminous filler), the threshold generated after triggering of the setting is too low. The bottom layer begins to sag as soon as the second layer is deposited and it gives out completely after a few more layers (3 for E-7 ink and 5 for E-9 ink).

On the contrary, the E-6 and E-8 inks (which contain a silicoaluminous filler) allow a stacking of layers up to at least 20 successive layers without observing deformation or sagging of the lower layer.

The invention claimed is:

1. A cement composition comprising:
   from 95% to 99.5% by weight of a Portland cement and a sulphoaluminous cement; and
   from 0.5% to 5% by weight of a filler selected from the group consisting of a silicoaluminous filler, silica fume, and a combination of a silicoaluminous filler and silica fume, wherein the filler has a specific surface area of at least 5 m$^2$/g,
   wherein the cement composition is adapted for 3D printing,
   wherein the cement composition further contains a limestone filler and/or a setting retarder.

2. The cement composition according to claim 1, wherein the cement composition contains from 10% to 95% by weight relative to the total weight of cement of a Portland cement.

3. The cement composition according to claim 1, wherein the silicoaluminous filler is selected from natural pozzolans and calcined clays.

4. A 3D printing method comprising the following steps:
   contacting the cement composition according to claim 1 with water optionally added with superplasticizer and mixing of the whole;
   pumping of the composition thus obtained to a print head and optionally adding a setting trigger;
   printing.

5. A kit for the preparation of a cement composition for 3D printing according to claim 1, said kit comprising:
   a Portland cement;
   and a sulphoaluminous cement;
   wherein the filler selected from the group consisting of a silicoaluminous filler, silica fume, and a combination of a silicoaluminous filler and silica fume, is present in an element of the kit containing the Portland cement and/or in an element of the kit containing the sulphoaluminous cement, and
   wherein the limestone filler and/or setting retarder is present in an element of the kit containing the Portland cement and/or in an element of the kit containing the sulphoaluminous cement.

6. A 3D printing method implementing the kit according to claim 5 comprising the following steps:
   contacting the composition containing Portland cement optionally added with superplasticizer with water and mixing the whole and, separately, bringing the composition containing the sulphoaluminous cement into contact with water optionally added with superplasticizer and mixing of the whole;
   pumping each of the compositions thus obtained to a print head, bringing them into contact, optionally in the presence of a setting trigger; and
   printing.

7. The cement composition according to claim 1, wherein the cement composition does not contain a hardening inhibitor.

8. A cement composition consisting essentially of:

from 95% to 99.5% by weight of a Portland cement and a sulphoaluminous cement;

from 0.5% to 5% by weight of a filler selected from the group consisting of a silicoaluminous filler, silica fume, and a combination of a silicoaluminous filler and silica fume, wherein the filler has a specific surface area of at least 5 $m^2/g$; and optionally, a limestone filler and/or a setting retarder, wherein the cement composition is adapted for 3D printing, wherein the cement composition further contains a limestone filler and/or a setting retarder.

9. The cement composition according to claim 8, wherein the silicoaluminous filler is selected from natural pozzolans and calcined clays.

10. The cement composition according to claim 8, wherein the cement composition does not contain a hardening inhibitor.

* * * * *